May 23, 1939. W. J. D. VAN DIJCK 2,159,621
PROCESS FOR THE BATCH DISTILLATION OF LIQUID MIXTURES
Filed March 8, 1937
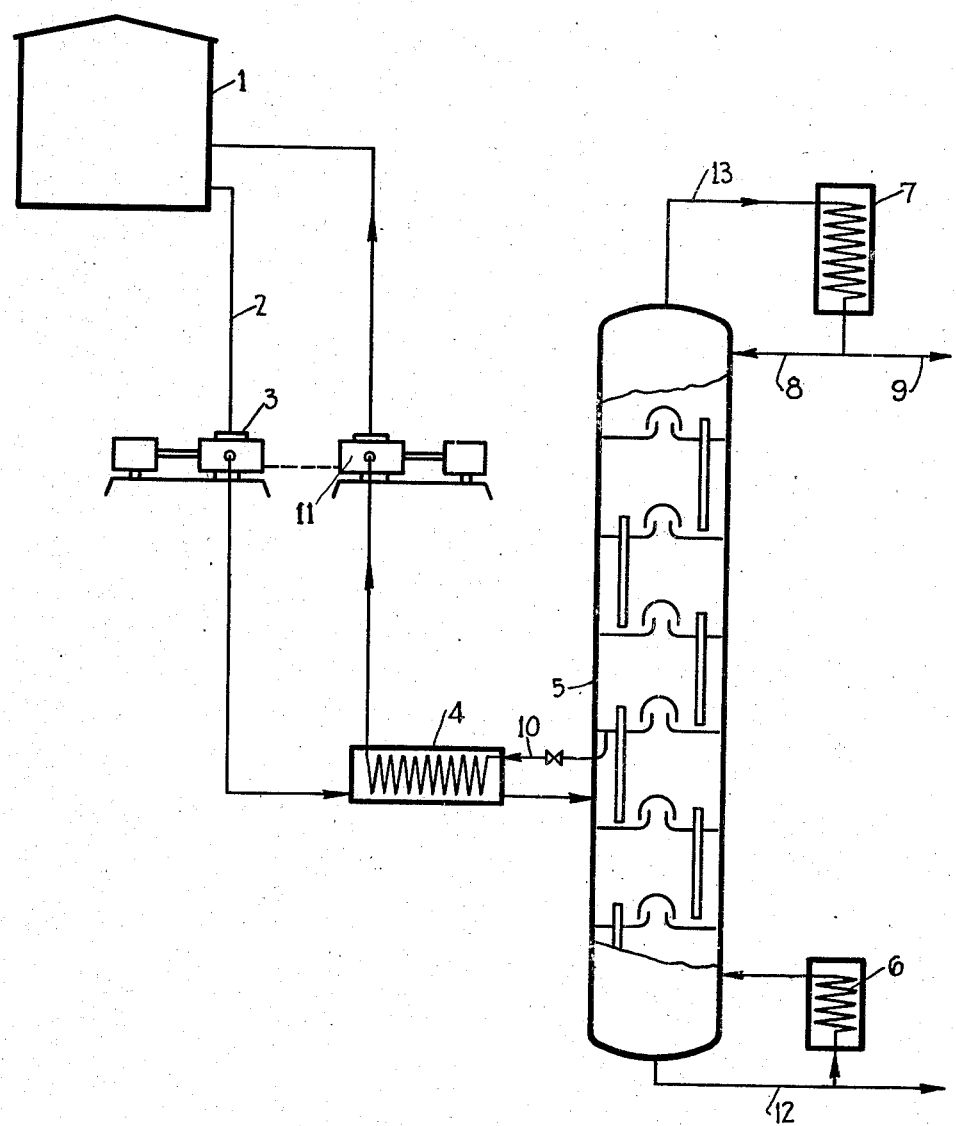
INVENTOR—WILLEM JOHANNES DOMINICUS VAN DIJCK
BY HIS ATTORNEY Patented May 23, 1939

2,159,621

UNITED STATES PATENT OFFICE

2,159,621

PROCESS FOR THE BATCH DISTILLATION OF LIQUID MIXTURES

Willem Johannes Dominicus van Dijck, The Hague, Netherlands, assignor to Shell Development Company, San Francisco, Calif., a corporation of Delaware Application March 8, 1937, Serial No. 129,564
In the Netherlands March 12, 1936

3 Claims. (Cl. 202—39)

The invention relates to a process and apparatus for the batch distillation of liquid mixtures.

The fractionating of liquid mixtures, such as those of the nature of mineral oil or mineral oil products, is nowadays practically always effected continuously. When, however, it is desired to produce continuously a large number of relatively narrow fractions, i. e., fractions having a narrow boiling range, any two successive ones of which do not or only slightly overlap, a complicated and costly apparatus with many columns is required. If moreover the composition of the initial material does not remain quite constant, such an apparatus is very difficult to control in view of the regulation of any one column affecting all the subsequent columns.

When applying the usual batch process it is indeed possible to produce a large number of narrow fractions with a simpler apparatus, the control being then also much simpler in view of the various fractions appearing in succession, but such a process requires much heat. Moreover this batch process involves several other drawbacks, to which further reference will be made later on, and one of which is very obvious, viz., the drawback—at least if it is desired to keep the dimensions of the stills, etc., within reasonable limits—that only relatively small charges can be worked at a time, so that much time and labour is involved in the refilling of the stills, the heating and adjusting of the apparatus, the changing-over to other distillate receiving tanks and the mixing of the fractions of the same composition obtained in the successive distillations.

Now the invention relates to a method according to which the distillation is also carried out discontinuously, but whereby the above-mentioned drawbacks are avoided. By batch distillation (discontinuous distillation) is meant here a method of distilling whereby the composition of the products formed changes with time, i. e., substantially no extraneous distillable liquid is introduced into the distillation system comprising the storage tank and the distillation column in the course of the distillation.

According to the invention the liquid mixture to be distilled is fed continuously from a storage tank into a distillation zone, in which a (gaseous) light product and a (liquid) heavy product are simultaneously separated off, while intermediate mixture is continuously drawn off from the distillation zone. The latter mixture may, according to the invention, be returned either to the original stock (present in one or more tanks) or to one or more other storage tanks.

Further according to the invention a heat exchange is effected between the mixture flowing from storage to the distillation zone and the mixture drawn off from the distillation zone. It is thus attained that the temperature of the mixture outside the distillation zone does not become high, so that the respective storage tank or tanks need not be constructed for high temperatures.

The quantity of liquid flowing to the distillation zone per unit of time naturally exceeds the quantity flowing in opposite direction, although the said quantity may be of the order of the quantity of liquid fed. In fact, the former quantity is the sum of the circulating quantity and the top and bottom products. Consequently a larger quantity of cold than of hot liquid flows through the heat-exchanger, which increases its efficiency. The pumps by means of which the liquid is forced from and to the distillation zone are, according to the invention, preferably coupled mechanically, such with a view to a proper control, this mechanical coupling being of particular importance when a superatmospheric pressure or a vacuum is maintained in the distillation zone. The said pumps are further preferably placed at the cold end of the heat-exchanger.

The distillation zone may, for example, consist of a column known per se from the continuous distillation, which is heated at the bottom, e. g., by circulating a portion of the bottom product and heating it outside the column. Further the column may be equipped with the usual trays with bubble caps or other means for effecting a thorough contact and a good exchange between vapour and liquid. At the top of the column the vapours are withdrawn, a portion thereof after condensation being returned as reflux to the top of the column. The heavy product is drawn off in the liquid state from the bottom of the column. The liquid flowing from top to bottom is withdrawn from the column just above the feed and pumped to the original storage tank or a second storage tank, whilst it is not essential that all the liquid flowing down is withdrawn. A portion may flow off in the usual manner to the feed tray, which may sometimes be of advantage with a view to facilitating the control. The mixture already subjected to distillation, which is continuously drawn off from the distillation zone, generally differs in composition from the reflux returned into the column at the top.

The process according to the invention is explained below with reference to the drawing.

The storage tank 1 contains the liquid to be distilled, e. g., a crude benzine. By means of the pump 3 the oil is forced from the tank through conduit 2 and heat-echanger 4 to the middle of column 5. Column 5 is provided with a reboiler 6, in which a portion of the bottom product is heated and from which it is returned to the bottom of the column. At the top of the column the vapours of the light product escape through conduit 13; these vapours are condensed in condenser 7 and a portion of the condensate is returned as reflux into the column through conduit 8. The top product is drawn off through conduit 9 and—in so far as necessary—further condensed, if desired, in several steps to effect a fractionation.

The bottom product is withdrawn at the bottom of the column through conduit 12. The liquid flowing down in the column is returned to storage tank 1 through conduit 10 and heat-exchanger 4, by means of pump 11. The reflux returned to the storage tank is mixed with the feed liquid therein. If the mixing of the two liquids is not desired, care must be exercised to avoid agitation when discharging the reflux into tank 1, or a separate tank may be provided for receiving the withdrawn reflux.

When the apparatus outlined above is put into operation, the lightest fraction is drawn off as top product at the top of the column and the heaviest fraction as bottom product at the bottom of the column. As the distillation proceeds the composition of the top product becomes heavier and that of the bottom product lighter, so that any number of light fractions with increasing specific gravity or boiling point and at the same time any number of heavy fractions with decreasing specific gravity or boiling point may be collected, until finally the compositions of top and bottom product become substantially the same, when the distillation has been completed, whilst the product still present in the storage tank is drawn off as a pure fraction. A new charge can then be treated.

The manner of supplying heat to the column by means of reboiler 6, as described, is not the only one possible. Besides this or instead thereof of boilers or other plants known per se may be used for supplying the heat required. Further a storage tank may be connected up to more than one column or one column to more than one storage tank. One may, for example, proceed in such a manner that while the contents of one or several tanks are being distilled, another tank or several other tanks are being filled with a new charge. The distillation may, for example, also be carried out in one column until the liquid in the storage tank has acquired a certain composition, after which the distillation may be continued in another column.

As the method described will be applied in particular to obtain a number of narrow fractions, one may, for instance, after these fractions have been obtained, distil the remainder—if no narrow fractions are required—further in a conventional continuous manner.

The process according to the invention offers various important advantages as compared with conventional batch distillation. Since a top product and a bottom product are manufactured simultaneously, the consumption of heat is only half that which would be required if the same fractions were to be produced according to the known batch distillation.

The storage tank(s) may be very large in relation to the size of the column. It is, therefore, possible to work very large charges at a time, so that the compositions of top product and bottom product change relatively slowly; which is of advantage for an easy control of the apparatus, since only when the column runs through a series of pseudo equilibria can its maximum efficiency be achieved.

No large stills being present, in which the liquid is to be kept at a high temperature for a considerable time—as is the case with the usual batch distillation—the danger of thermal decomposition is reduced to a minimum.

One may also dispense with heating the stock to the boiling point, during which period no products are obtained, much time and labour thus being saved.

Finally the existing continuous distilling plants may be adapted in a simple manner to carrying out the process according to the invention, since any normal continuous process-column can be used for this purpose. The process according to the invention may in principle be applied to any liquid mixture which can and is to be separated by distillation; the process according to the invention may also be applied for distilling azeotropic mixtures, which is done with an auxiliary substance. The separation of lower boiling hydrocarbon mixtures, e. g., benzines, into narrow fractions, of mixtures of alcohols or of olefines, and like operations, may be advantageously effected according to the present process.

I claim:

1. The batch process for fractionating a quantity of a liquid distillable mixture containing a plurality of constituents of progressively different volatilities comprising confining said mixture in an unheated storage vessel, withdrawing a relatively small stream of said mixture from the storage vessel and introducing the same into an intermediate point of a distillation zone provided with dephlegmating and stripping sections, maintaining within the zone countercurrent streams of vapors and liquid reflux, simultaneously withdrawing top and bottom products from opposite ends of the zone and withdrawing at least a portion of the reflux from the dephlegmating section and from the distillation zone, introducing the withdrawn reflux into the storage vessel into contact with the remaining portion of the mixture and passing a relatively small stream of the resulting mixture to the said distillation zone, while withdrawing therefrom the said products and said portion of the reflux the only replenishment of distillable liquid for said tank being said withdrawn reflux.

2. The process of claim 1, in which the withdrawn reflux is first substantially cooled by an indirect heat exchange with the mixture passing from the storage vessel to the distillation zone and then introduced into the said vassel.

3. The batch process for fractionating a quantity of a liquid distillable mixture containing a plurality of constituents of progressively different volatiles comprising confining said mixture in an unheated storage vessel, withdrawing a relatively small stream of said mixture from the storage vessel and introducing the same into an intermediate point of a distillation zone provided with dephlegmating and stripping sections, maintaining within the zone countercurrent streams of vapors and liquid reflux, simultaneously withdrawing top and bottom products from opposite ends of the zone and withdrawing at least a portion of the reflux from the dephlegmating section and from the distillation zone, introducing the withdrawn reflux into the storage vessel to commingle with the remaining portion of the mixture and passing a relatively small stream of the resulting mixture to the said distillation zone, while withdrawing therefrom the said products and said portion of the reflux the only replenishment of distillable liquid for said tank being said withdrawn reflux.

WILLEM JOHANNES DOMINICUS van DIJCK.